(12) United States Patent
Sakaguchi et al.

(10) Patent No.: US 12,429,703 B2
(45) Date of Patent: Sep. 30, 2025

(54) LIGHT REFRACTION MEMBER, OPTICAL SYSTEM, LIGHTING SYSTEMS, DISPLAY SYSTEMS, MOVING OBJECT, AND MOLD

(71) Applicant: Panasonic Intellectual Property Management Co., Ltd., Osaka (JP)

(72) Inventors: Tomohisa Sakaguchi, Kyoto (JP); Wahei Agemizu, Osaka (JP); Kazumasa Takata, Osaka (JP); Masaru Fujita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 921 days.

(21) Appl. No.: 17/497,714

(22) Filed: Oct. 8, 2021

(65) Prior Publication Data

US 2022/0128829 A1 Apr. 28, 2022

(30) Foreign Application Priority Data

Oct. 28, 2020 (JP) ................. 2020-180865

(51) Int. Cl.
| | |
|---|---|
| *G02B 3/08* | (2006.01) |
| *B60K 35/22* | (2024.01) |
| *B60K 35/60* | (2024.01) |
| *G02B 27/01* | (2006.01) |
| *G02B 27/09* | (2006.01) |
| *B60K 35/23* | (2024.01) |

(52) U.S. Cl.
CPC .......... *G02B 27/0972* (2013.01); *B60K 35/22* (2024.01); *B60K 35/60* (2024.01); *G02B 27/0101* (2013.01); *B60K 35/23* (2024.01); *B60K 2360/23* (2024.01); *B60Y 2200/11* (2013.01)

(58) Field of Classification Search
CPC ... G02B 27/0101; G02B 27/0179; G02B 3/08
See application file for complete search history.

(56) References Cited

U.S. PATENT DOCUMENTS

| 2005/0141243 A1* | 6/2005 | Mullen ................ G03F 7/001 |
| | | 362/600 |
| 2007/0010594 A1 | 1/2007 | Wang et al. |

(Continued)

FOREIGN PATENT DOCUMENTS

| JP | 2004-507866 | 3/2004 |
| JP | 2008-544303 | 12/2008 |

(Continued)

*Primary Examiner* — Joseph P Martinez

(74) *Attorney, Agent, or Firm* — Wenderoth, Lind & Ponack, L.L.P.

(57) ABSTRACT

A light refraction member includes an incident surface on which planar light is incident, a plurality of refractors that refract the planar light, and an emitting surface from which the planar light refracted by the plurality of refractors is emitted as emitted light. The plurality of refractors are provided side by side in a first direction on at least one of the incident surface and the emitting surface, and each of the plurality of refractors has an area in which a direction in which the planar light is refracted changes along a second direction intersecting the first direction.

11 Claims, 11 Drawing Sheets

(56) References Cited

U.S. PATENT DOCUMENTS

| | | | |
|---|---|---|---|
| 2013/0107543 A1* | 5/2013 | Parker | G02B 27/00 362/326 |
| 2017/0230628 A1 | 8/2017 | Ichikawa et al. | |
| 2018/0374407 A1 | 12/2018 | Furuya et al. | |

FOREIGN PATENT DOCUMENTS

| | | |
|---|---|---|
| JP | 2011-90832 | 5/2011 |
| JP | 2013-97876 | 5/2013 |
| JP | 2015-014681 | 1/2015 |
| JP | 2017-142491 | 8/2017 |
| JP | 2018-163259 | 10/2018 |
| JP | 2019-008135 | 1/2019 |
| WO | 02/04858 | 1/2002 |
| WO | 2008/062638 | 5/2008 |

* cited by examiner

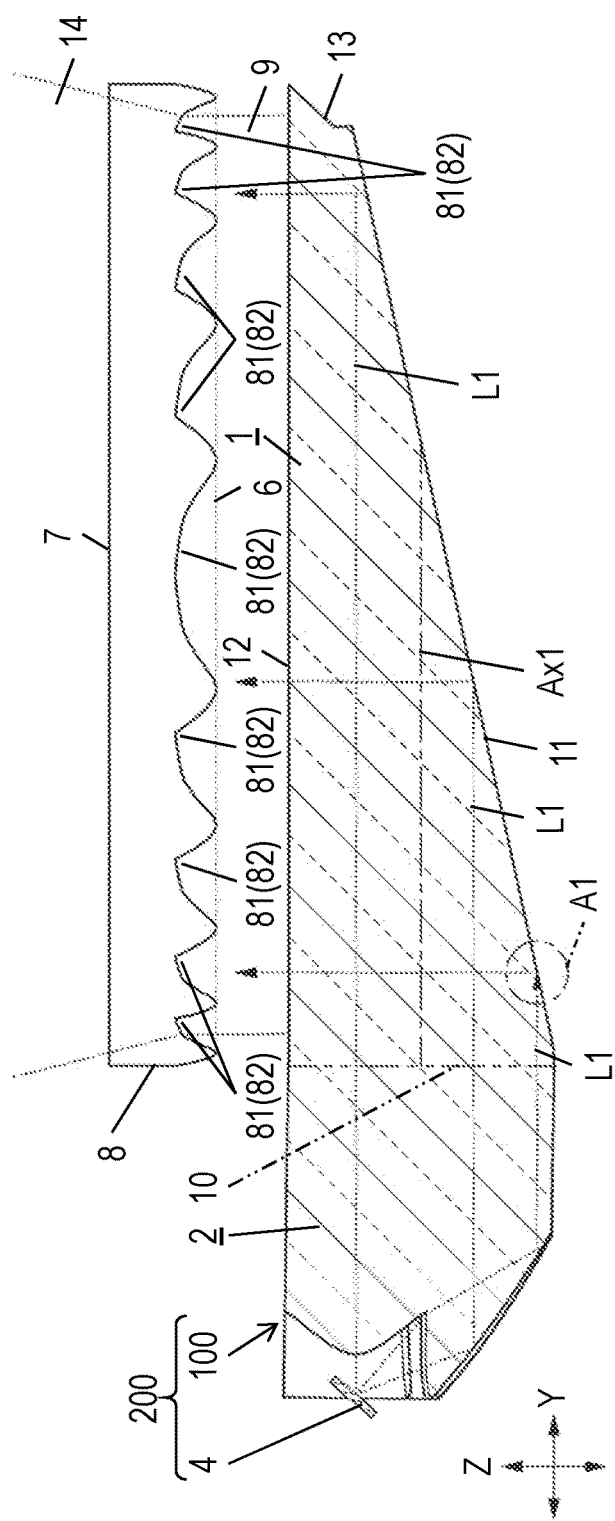
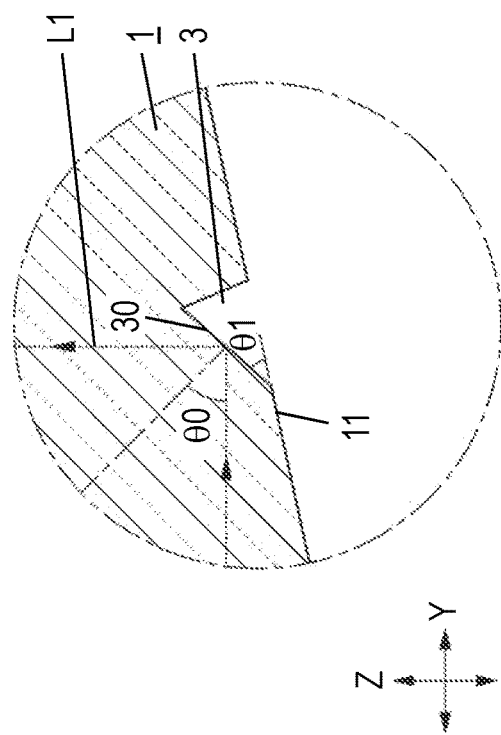
FIG. 1A
FIG. 1B

LIGHT REFRACTION MEMBER, OPTICAL SYSTEM, LIGHTING SYSTEMS, DISPLAY SYSTEMS, MOVING OBJECT, AND MOLD

BACKGROUND

1. Technical Field

The present disclosure generally relates to a light refraction member, an optical system, a lighting system, a display system, a moving object, and a mold. More specifically, the present disclosure relates to a light refraction member that controls light incident from an incident surface and emits the light from an emitting surface, an optical system, a lighting system, a display system, a moving object, and a mold for forming the light refraction member.

2. Description of the Related Art

Japanese Unexamined Patent Publication No. 2017-142491 discloses an image display device (display system) that projects a virtual image into a target space. This image display device is a vehicle HUD (Head-Up Display) device. The projected light, which is the image light emitted from the vehicle HUD device (optical system) in a dashboard, is reflected by a windshield and directed toward a driver who is the viewer. As a result, the user (driver) can visually recognize an image such as a navigation image as a virtual image to visually recognize the virtual image as if the virtual image is superimposed on the background such as a road surface.

SUMMARY

A light refraction member according to one aspect of the present disclosure includes an incident surface on which planar light is incident, a plurality of refractors that refract the planar light, and an emitting surface from which the planar light refracted by the plurality of refractors is emitted as emitted light. The plurality of refractors are provided side by side in a first direction on at least one of the incident surface and the emitting surface, and each of the plurality of refractors has a region in which a direction in which the planar light is refracted changes along a second direction intersecting the first direction.

A mold according to one aspect of the present disclosure is a mold for forming a light refraction member, and includes a first mold portion provided with a cavity, a second mold portion to be clamped with the first mold portion, and a supply path for supplying a molten resin into the cavity. The cavity has a shape for forming the light refraction member. The light refraction member includes an incident surface on which planar light is incident, a plurality of refractors that refract the planar light, and an emitting surface from which the planar light refracted by the plurality of refractors is emitted as emitted light. The plurality of refractors are provided side by side in a first direction on at least one of the incident surface and the emitting surface, and each of the plurality of refractors has a region in which a direction in which the planar light is refracted changes along a second direction intersecting the first direction.

BRIEF DESCRIPTION OF THE DRAWINGS

FIG. 1A is a cross-sectional view schematically illustrating an optical system according to an embodiment;

FIG. 1B is an enlarged cross-sectional view of area A1 of FIG. 1A;

DETAILED DESCRIPTIONS

Figure 2:
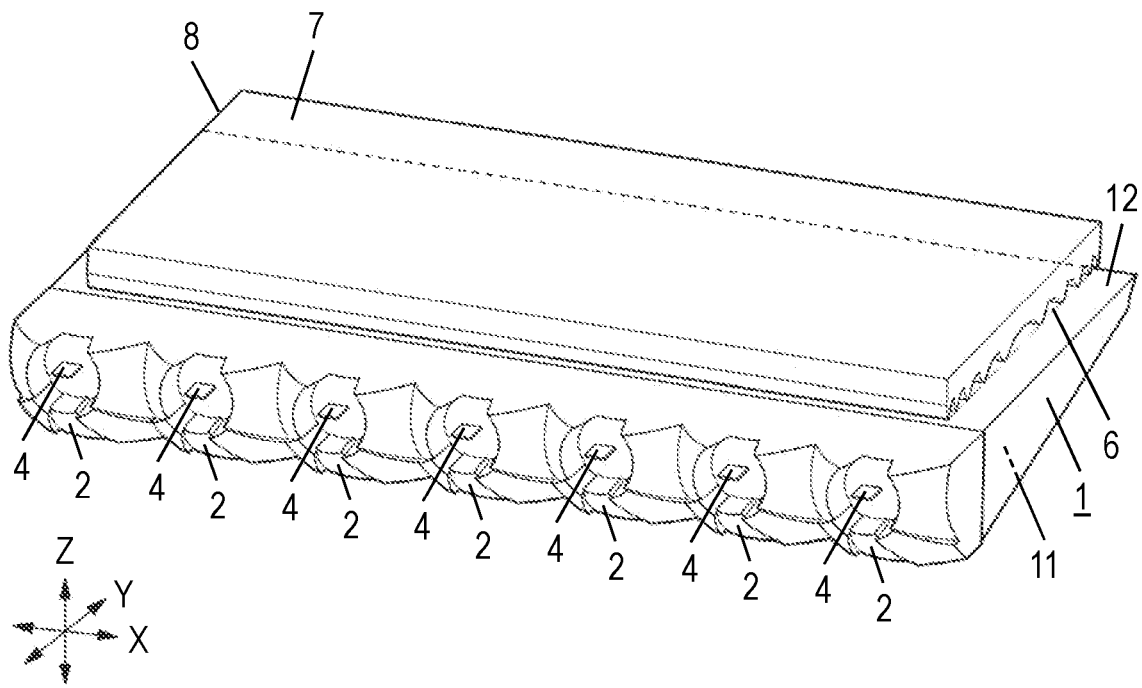
FIG. 2 is a perspective view schematically illustrating the same optical system.

An object of the present disclosure is to provide a light refraction member, an optical system, a lighting system, a display system, a moving object, and a mold capable of controlling the light distribution of emitted light.

The embodiment and modification example described below are merely examples of the present disclosure, and the present disclosure is not limited to the embodiment and modification example. Even if a disclosure is not the embodiment and the modification example, various changes can be made according to the design and the like as long as the disclosure does not deviate from the technical idea of the present disclosure.

(1) Overview

First, optical system 100 according to the present embodiment and lighting system 200 using optical system 100 will be described with reference to FIGS. 1A to 3.

Optical system 100 (see FIGS. 1A and 1B) according to the present embodiment has a function of controlling the light source light incident from light source incident surface 10 and emitting the light from emitting surface 7. Optical system 100 includes light refraction member 8, light guide member 1, and prism 3. Optical system 100 may further include light controller 2.

Optical system 100 constitutes lighting system 200 together with light source 4. In other words, lighting system 200 according to the present embodiment includes optical system 100 and light source 4. Light source 4 emits light source light incident on light source incident surface 10. As will be described in detail later, when optical system 100 includes light controller 2, the light source light from light source 4 does not directly enter light guide member 1, but enters light guide member 1 through light controller 2. That is, light source 4 emits the light source light to light source incident surface 10 through light controller 2.

As described above, in the present embodiment, optical system 100 further includes light controller 2 in addition to light refraction member 8, light guide member 1, and prism 3. Light controller 2 is positioned between light source 4 and light source incident surface 10 of light guide member 1 and controls the light source light emitted from light source 4 and incident on light source incident surface 10. In particular, in the present embodiment, light guide member 1 and light controller 2 are integrated as an integrally molded product. That is, in the present embodiment, light guide member 1 and light controller 2 are an integrally molded product and are inseparably integrated. In other words, light controller 2 is seamlessly continuous with respect to light source incident surface 10 of light guide member 1, and light guide member 1 and light controller 2 are seamlessly integrated. Therefore, in the present embodiment, light source incident surface 10 of light guide member 1 is a "virtual surface" defined inside the integrally molded product of light guide member 1 and optical controller 2, and is not accompanied by an entity. Light controller 2 may be formed in a form separated from light guide member 1. Light controller 2 is not an essential configuration for optical system 100, and can be omitted as appropriate.

In the present embodiment, light guide member 1 has light source incident surface 10 on which the light source light from light source 4 is incident, and first surface 11 and second surface 12 facing each other. Prism 3 is provided on first surface 11. Prism 3 reflects the light source light passing through the inside of light guide member 1 toward second surface 12.

Light guide member 1 includes direct optical path L1 (see FIGS. 1A and 1B). Direct optical path L1 is an optical path in which the light source light incident from light source incident surface 10 is directly reflected by prism 3 and is emitted from second surface 12 as planar light 9. Planar light 9 as used herein refers to light whose range of the light source light emitted from second surface 12 is wider than the range of the light source light incident on light source incident surface 10 due to reflection by prism 3. Furthermore, light guide member 1 includes an optical path (direct optical path L1) in which the light source light incident on light guide member 1 from light source incident surface 10 is emitted from second surface 12 inside light guide member 1 after being reflected only once by prism 3. When the light source light passing through direct optical path L1 is incident on light guide member 1 from light source incident surface 10, the light reaches second surface 12 after being reflected only once by prism 3 without being reflected by other than prism 3 and is directly emitted from second surface 12 to the outside of light guide member 1 as it is as planar light 9.

In the present embodiment, most of the light source light incident on light guide member 1 from light source incident surface 10 and emitted from second surface 12 is guided inside light guide member 1 through direct optical path L1. Therefore, in the present embodiment, most of the light incident on light guide member 1 from light source incident surface 10 is reflected only once by prism 3 without being reflected by other than prism 3, and therefore is emitted from second surface 12 to the outside of light guide member 1.

In optical system 100 according to the present embodiment, as illustrated in FIG. 1A, optical axis Ax1 of the light incident from light source incident surface 10 is inclined with respect to first surface 11 so that the distance to first surface 11 decreases as the light moves away from light source incident surface 10. That is, in the present embodiment, optical axis Ax1 of the light source light incident from light source incident surface 10 is not parallel to first surface 11 but is inclined, and due to the inclination, the light source light approaches first surface 11 as the light source light moves away from light source incident surface 10.

As a result, the light source light incident from light source incident surface 10 approaches first surface 11 as the light source light moves away from light source incident surface 10, that is, as the light source light advances inside light guide member 1, and is likely to be incident on first surface 11 (including prism 3). Therefore, most of the light source light incident from light source incident surface 10 is likely to be incident on first surface 11 of light guide member 1 before reaching end surface 13 facing light source incident surface 10. In other words, since most of the light source light incident from light source incident surface 10 is less likely to reach end surface 13 of light guide member 1 opposite to light source incident surface 10, the light source light is less likely to leak from end surface 13. As a result, the ratio of planar light 9 emitted from second surface 12 to the outside of light guide member 1 through the direct optical path L1 to the light source light incident from light source incident surface 10 is increased, and it is possible to improve the extraction efficiency of the light source light.

Optical system 100 according to the present embodiment includes light refraction member 8 as illustrated in FIGS. 1A to 4B. Light refraction member 8 controls the light distribution of the light source light (planar light 9) extracted from second surface 12. The "light distribution" as used herein refers to the intensity distribution of light in a plane intersecting the optical axis in the light irradiation direction.

As illustrated in FIGS. 1A to 4B, light refraction member 8 includes incident surface 6, a plurality of refractors 81, and emitting surface 7. Planar light 9 emitted from second surface 12 of light guide member 1 is incident on incident surface 6. A plurality of refractors 81 refract planar light 9 incident on incident surface 6. From emitting surface 7, the light obtained by refracting planar light 9 by the plurality of refractors 81 is emitted as emitted light 14. Here, the plurality of refractors 81 are provided side by side in the first direction on at least one of incident surface 6 and emitting surface 7.

In the present embodiment, light refraction member 8 is provided so that incident surface 6 faces second surface 12 of light guide member 1. The plurality of refractors 81 are provided on incident surface 6 in a direction parallel to emitting surface 7 and aligned with the depth direction of light guide member 1 (the direction in which optical axis Ax1 extends in FIG. 1A). In other words, the light source light is incident on light source incident surface 10 of light guide member 1 along the direction in which the plurality of refractors 81 are arranged in incident surface 6 of light refraction member 8. Each of the plurality of refractors 81 is a curved lens having a curvature in the depth direction of light guide member 1 and having a shape recessed with respect to incident surface 6.

As a result, planar light 9 incident on incident surface 6 is refracted by plurality of refractors 81, and is emitted from emitting surface 7 as emitted light 14.

Figure 3:
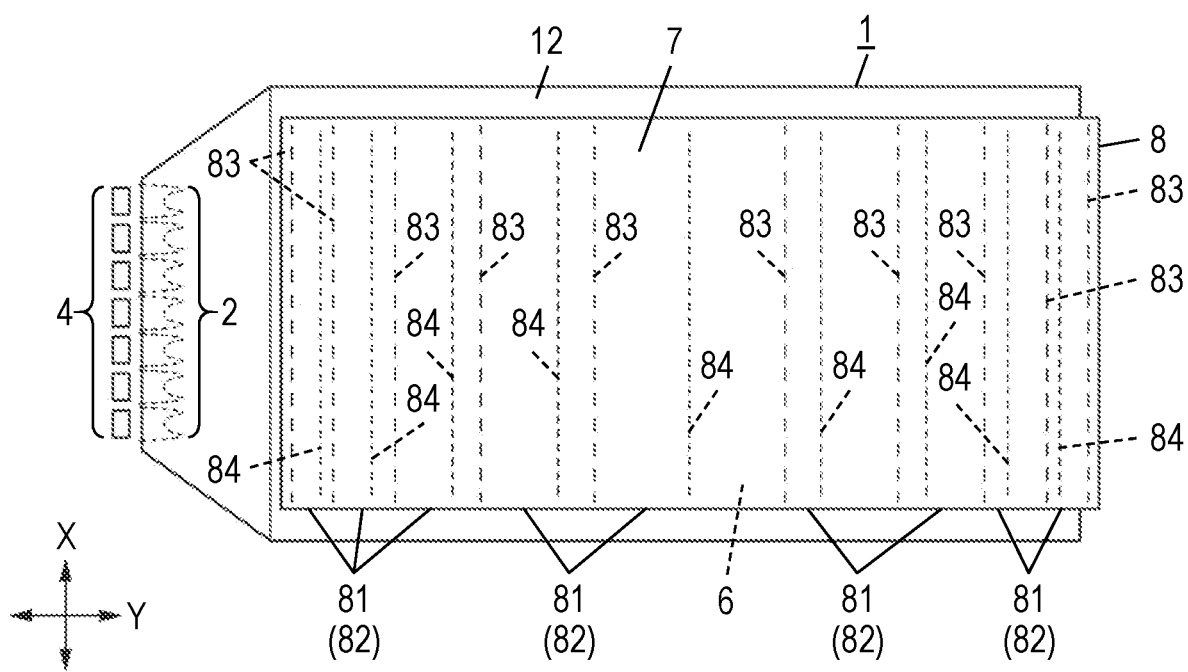
FIG. 3 is a plan view schematically illustrating the same optical system.
Figure 4A:
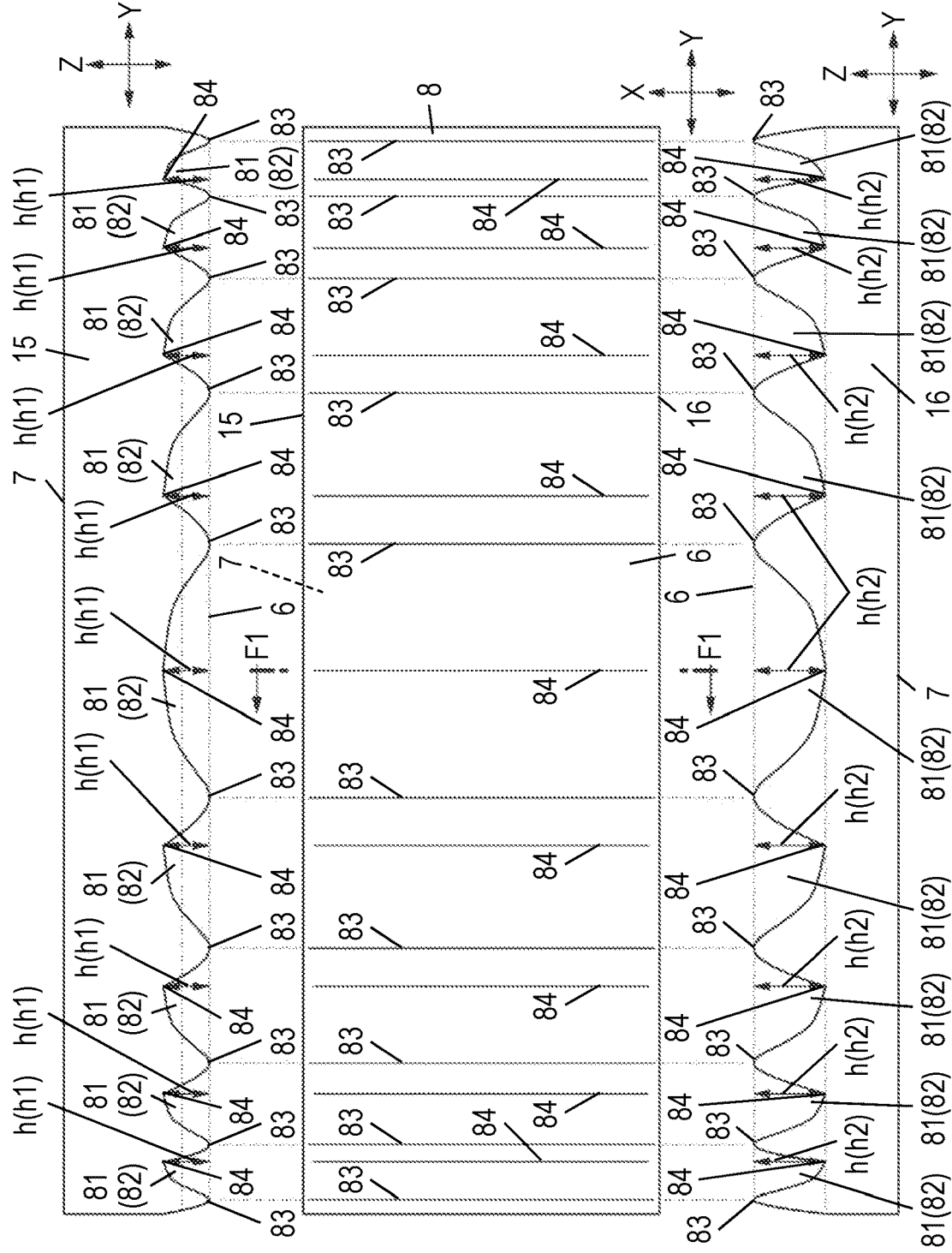
FIG. 4A is a plan view and a side view schematically illustrating a light refraction member included in the same optical system.
Figure 4B:
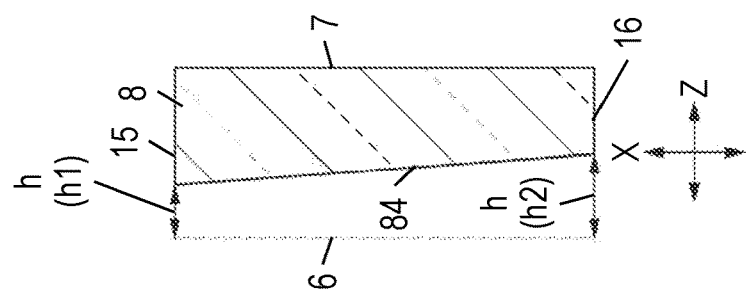
FIG. 4B is a cross-sectional view taken along line F1-F1 of FIG. 4A.

As illustrated in FIGS. 4A and 4B, each of the plurality of refractors 81 has a region in which the direction in which planar light 9 is refracted changes in the width direction (the direction in which a plurality of light sources 4 are arranged in FIG. 3) of light guide member 1. Each of the plurality of refractors 81 is continuous along the width direction of light guide member 1 which intersects perpendicularly with the depth direction of light guide member 1.

That is, when the light incident on light refraction member 8 is moved along the width direction of light guide member 1 while maintaining the direction of the optical axis, the plurality of refractors 81, each of which is a curved lens, have a region in which the direction of the optical axis of emitted light 14 continuously changes. The "optical axis" as used herein means a virtual light beam which is a representative of a luminous flux passing through the entire system.

(2) Details

Hereinafter, light refraction member 8 according to the present embodiment, optical system 100 using light refraction member 8, lighting system 200 using optical system 100, display system 300 using lighting system 200, moving object B1, and mold 17 for forming light refraction member 8 will be described in detail with reference to FIGS. 1A to 13.

(2.1) Premise

In the following description, it is assumed that the width direction of light guide member 1 (the direction in which a plurality of light sources 4 are arranged in FIG. 3) is an "X-axis direction", and the depth direction of light guide member 1 (the direction in which optical axis Ax1 extends in FIG. 1A) is a "Y-axis direction". In the following description, it is assumed that the thickness direction of light guide member 1 (the direction in which first surface 11 and second surface 12 are arranged in FIG. 1A) is a "Z-axis direction". The X-axis, Y-axis, and Z-axis that define these directions are orthogonal to each other. The arrows indicating the "X-axis direction", "Y-axis direction", and "Z-axis direction" in the drawings are illustrated for explanation purposes only and are not accompanied by an entity.

The "extraction efficiency" as used in the present disclosure refers to the ratio of the amount of planar light 9 emitted from second surface 12 of light guide member 1 to the amount of the light source light incident on light source incident surface 10 of light guide member 1. That is, if the relative ratio of the amount of the light source light (planar light 9) emitted from second surface 12 of light guide member 1 to the amount of the light source light incident on light source incident surface 10 of light guide member 1 becomes large, the light extraction efficiency becomes high. As an example, if the amount of light source light incident on light source incident surface 10 of light guide member 1 is "100", whereas the amount of planar light 9 emitted from second surface 12 of light guide member 1 is "10", the light extraction efficiency of light guide member 1 is 10%.

The "parallel" as used in the present disclosure means that the two substances are substantially parallel, that is, in addition to the case where the two substances are strictly parallel, the angle between the two substances is within a range of several degrees (for example, less than 5 degrees).

The "orthogonal" as used in the present disclosure means that two substances are substantially orthogonal to each other, that is, in addition to the case where the two substances are strictly orthogonal to each other, the angle between the two substances is within a range of several degrees (for example, less than 5 degrees) based on 90 degrees.

(2.2) Display System

First, display system 300 will be described with reference to FIGS. 5 and 6.

Figure 5:
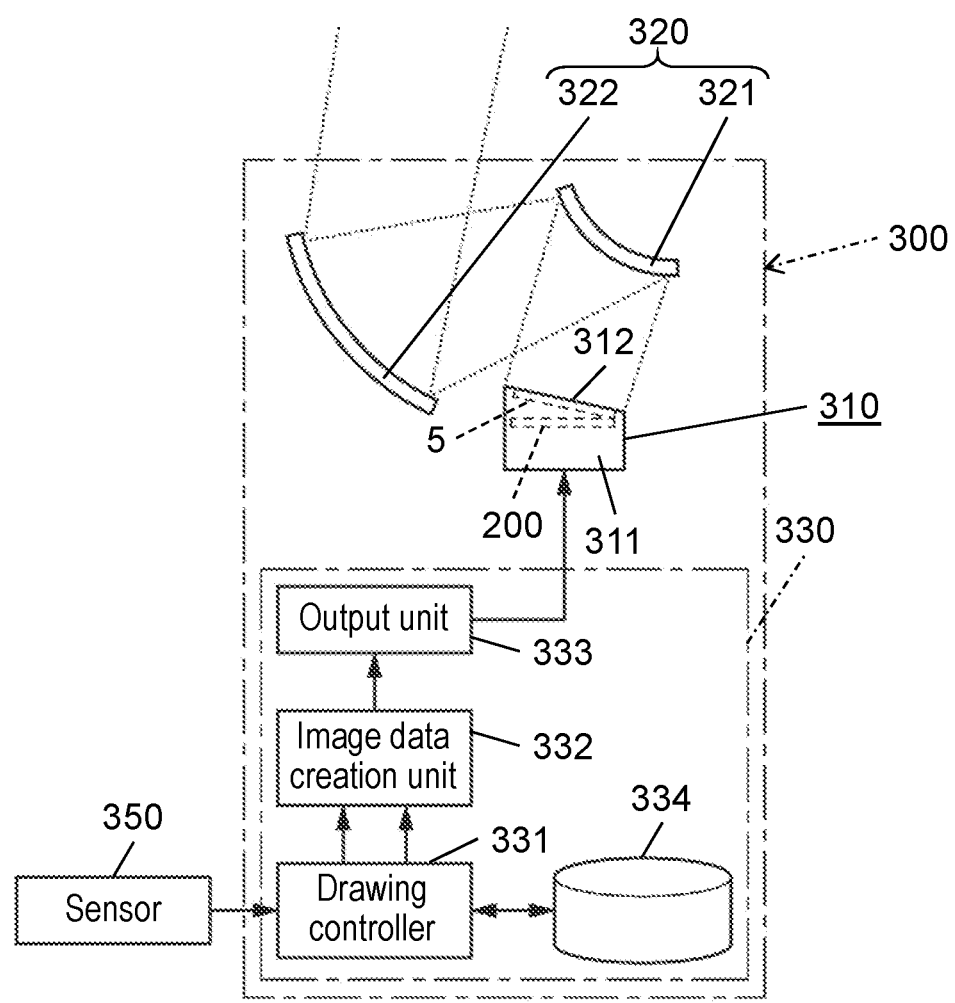
FIG. 5 is an explanatory view of a display system using the same optical system.

As illustrated in FIG. 5, lighting system 200 according to the present embodiment constitutes display system 300 together with display device 5. In other words, display system 300 according to the present embodiment includes lighting system 200 and display device 5. Display device 5 receives emitted light 14 emitted from lighting system 200 and displays an image. The "image" referred to here is an image displayed in a manner that is visible to user U1 (see FIG. 6) and may be a figure, a symbol, a character, a number, a pattern, a photograph, or a combination thereof. The image displayed by display system 300 includes a moving image and a still image. Further, the "moving image" includes an image composed of a plurality of still images obtained by time-lapse photography or the like.

Figure 6:
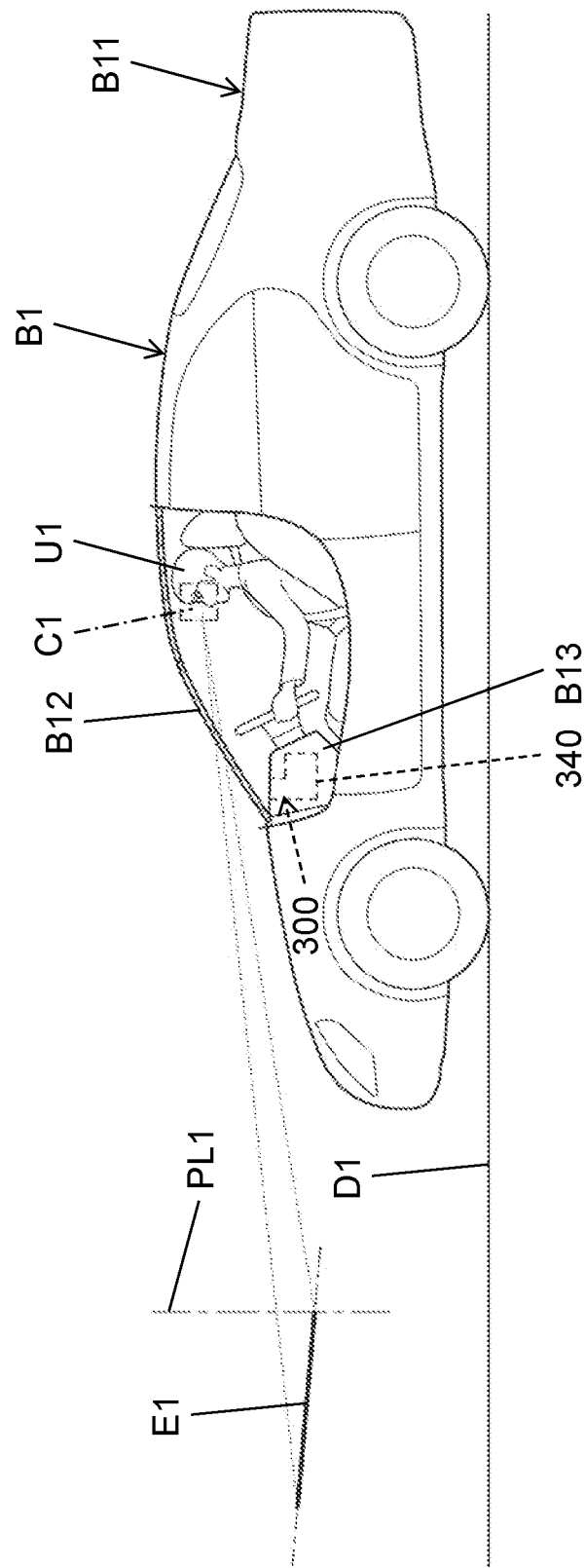
FIG. 6 is an explanatory view of a moving object including the same display system.

As illustrated in FIG. 6, display system 300 according to the present embodiment constitutes moving object B1 such as a vehicle together with moving object body B11. In other words, moving object B1 according to the present embodiment includes display system 300 and moving object body B11. Moving object body B11 is equipped with display system 300. In the present embodiment, as an example, moving object B1 is a vehicle (passenger car) driven by a person. In this case, user U1 who visually recognizes the image displayed by display system 300 is an occupant of moving object B1, and in the present embodiment, as an example, the driver of the vehicle as moving object B1 is assumed to be user U1.

In the present embodiment, display system 300 is used, for example, as a head-up display (HUD) mounted on moving object B1. Display system 300 is used, for example, to display driving support information related to speed information, condition information, driving information, and the like of moving object B1 in the field of view of user U1. The driving information of moving object B1 includes, for example, navigation-related information that displays a traveling route and the like, and ACC (Adaptive Cruise Control)-related information that keeps the traveling speed and the inter-vehicle distance constant.

As illustrated in FIGS. 5 and 6, display system 300 includes image display unit 310, optical system 320, and controller 330. Display system 300 further includes housing 340 that accommodates image display unit 310, optical system 320, and controller 330.

Housing 340 is made of, for example, a molded product of synthetic resin. Housing 340 accommodates image display unit 310, optical system 320, controller 330, and the like. Housing 340 is attached to dashboard B13 of moving object body B11. The light reflected by second mirror 322 (described later) of optical system 320 is emitted to the reflective member (windshield B12) through the opening on the upper surface of housing 340, and the light reflected by windshield B12 is focused on eyebox C1. The reflective member is not limited to windshield B12, but may be realized by, for example, a combiner placed on dashboard B13 of moving object body B11.

According to such display system 300, user U1 visually recognizes the virtual image projected in the space in front of moving object B1 (outside the vehicle) through windshield B12. The term "virtual image" as used in the present disclosure means an image in which when the light emitted from display system 300 is diverged by a reflective member such as windshield B12, the diverged light beams actually form an object. Therefore, user U1 who is driving moving object B1 visually recognizes an image as a virtual image projected by display system 300 by being superimposed on the real space spreading in front of moving object B1. In short, display system 300 according to the present embodiment displays a virtual image as an image. The image (virtual image) that can be displayed by display system 300 includes virtual image E 1 superimposed along traveling surface D1 of moving object B1 and a virtual image three-dimensionally drawn along plane PL1 orthogonal to traveling surface D1.

Image display unit 310 includes case 311. Image display unit 310 has a function of displaying a three-dimensional image by a light field method of making an object appear three-dimensional by reproducing the light emitted from the object in the image in a plurality of directions. However, the method in which image display unit 310 three-dimensionally displays a virtual image of an object of three-dimensional drawing is not limited to the light field method. Image display unit 310 may employ a parallax method that allows user U1 to visually recognize a virtual image of a three-dimensional drawing object by projecting images having parallax on the left and right eyes of user U1.

Image display unit 310 includes display device 5 and lighting system 200 including optical system 100. Display device 5 is, for example, a liquid crystal display or the like and displays an image by receiving light emitted from lighting system 200. That is, lighting system 200 emits light from behind display device 5 toward display device 5, and the light from lighting system 200 passes through display device 5, and therefore display device 5 displays an image. In other words, lighting system 200 functions as a backlight for display device 5.

Case 311 included in image display unit 310 accommodates lighting system 200 including optical system 100 and light source 4, and display device 5. Lighting system 200 and display device 5 are held in case 311. Here, display device 5 is placed along the upper surface of case 311 so that one surface of display device 5 is exposed from the upper surface of case 311.

Lighting system 200 is disposed below display device 5 in case 311 and outputs light from below display device 5 toward display device 5. As a result, the upper surface of case 311 constitutes display surface 312 on which an image is displayed.

Image display unit 310 is accommodated inside housing 340 with display surface 312 facing first mirror 321 (described later). Display surface 312 of image display unit 310 has a shape (for example, a rectangular shape) that matches the range of the image projected on user U1, that is, the shape of windshield B12. A plurality of pixels are disposed in an array on display surface 312 of image display unit 310. The plurality of pixels of image display unit 310 emit light according to the control of controller 330, and an image is displayed on display surface 312 by the light output from display surface 312 of image display unit 310.

The image displayed on display surface 312 of image display unit 310 is emitted to windshield B12, and the light reflected by windshield B12 is focused on eyebox C1. That is, the image displayed on display surface 312 is visually recognized by user U1 who has a viewpoint in eyebox C1 through optical system 320. At this time, user U1 visually recognizes the virtual image projected on the space in front of moving object B1 (outside the vehicle) through windshield B12.

Optical system 320 collects the light output from display surface 312 of image display unit 310 on eyebox C1. In the present embodiment, optical system 320 includes, for example, first mirror 321 which is a convex mirror, second mirror 322 which is a concave mirror, and windshield B12.

First mirror 321 reflects the light output from image display unit 310 and makes the light enter second mirror 322. Second mirror 322 reflects the light incident from first mirror 321 toward windshield B12. Windshield B12 reflects the light incident from second mirror 322 and makes the light enter eyebox C1.

Controller 330 includes, for example, a computer system. The computer system mainly includes one or more processors and one or more memories as hardware. When the program recorded in one or more memories or storage 334 of the computer system is executed by one or more processors, the functions of controller 330 (for example, the functions of drawing controller 331, image data creation unit 332, output unit 333, and the like) are realized. The program is pre-recorded in one or more memories or storage 334 of the computer system. The program may be provided through a telecommunication line or may be recorded and provided on a non-temporary recording medium such as a memory card, optical disk or hard disk drive readable by the computer system.

Storage 334 is realized by a non-temporary recording medium such as a rewritable non-volatile semiconductor memory. Storage 334 stores a program or the like executed by controller 330. As described above, display system 300 is used to display the driving support information related to the speed information, the condition information, the driving information, and the like of moving object B1 in the field of view of user U1. Therefore, the type of virtual image displayed by display system 300 is predetermined. Then, in storage 334, image data for displaying a virtual image (virtual image E 1 which is an object of plane drawing and a virtual image which is an object of three-dimensional drawing) is stored in advance.

Drawing controller 331 receives detection signals from various sensors 350 mounted on moving object B1. Sensor 350 is a sensor for detecting various types of information used in, for example, an advanced driver assistance system (ADAS). Sensor 350 includes, for example, at least one of a sensor for detecting the state of moving object B1 and a sensor for detecting the state around moving object B1. The sensor for detecting the state of moving object B1 includes, for example, a sensor for measuring the vehicle speed, temperature, residual fuel, or the like of moving object B1. The sensor for detecting the state around moving object B1 includes an image sensor that captures the surroundings of moving object B1, a millimeter wave radar, a light detection and ranging (LiDAR), and the like.

Drawing controller 331 acquires one or a plurality of pieces of image data for displaying information related to the detection signal from storage 334 based on the detection signal input from sensor 350. Here, when displaying a plurality of types of information on image display unit 310, drawing controller 331 acquires a plurality of pieces of image data for displaying the plurality of types of information. Drawing controller 331 obtains the position information related to the position where a virtual image is displayed in a target space where the virtual image is displayed, based on the detection signal input from sensor 350. Then, drawing controller 331 outputs the image data and the position information of the virtual image to be displayed to image data creation unit 332.

Image data creation unit 332 creates image data for displaying a virtual image to be displayed based on the image data and position information input from drawing controller 331.

Output unit 333 outputs the image data created by image data creation unit 332 to image display unit 310, and causes display surface 312 of image display unit 310 to display an image based on the created image data. The image displayed on display surface 312 is projected onto windshield B12, and therefore display system 300 displays the image (virtual image). In this way, the image (virtual image) displayed by display system 300 is visually recognized by user U1.

(2.3) Optical System

Next, optical system 100 will be described with reference to FIGS. 1A to 4B and 7A to 10.

That is, optical system 100 according to the present embodiment includes light refraction member 8, light guide member 1, a plurality of light controllers 2, and a plurality of prisms 3. That is, optical system 100 according to the present embodiment includes a plurality of optical controllers 2, and further includes a plurality of prisms 3.

In the present embodiment, optical system 100 constitutes lighting system 200 together with the plurality of light sources 4. That is, lighting system 200 according to the present embodiment includes optical system 100 and a plurality of light sources 4.

Since the plurality of light controllers 2 share a common configuration, the configuration described below for one light controller 2 is the same for the other light controllers 2 unless otherwise specified. Since a plurality of prisms 3 basically share the same configuration, the configuration described below for one prism 3 is the same for the other prisms 3 unless otherwise specified. Since the plurality of light sources 4 share a common configuration, the configuration described below for one light source 4 is the same for the other light sources 4 unless otherwise specified.

Light source 4 is, for example, a solid-state light emitting element such as a light emitting diode (LED) element or an organic electro-luminescence (OEL) element. As an example in the present embodiment, light source 4 is a chip-shaped light-emitting diode element. In reality, such light source 4 emits light on a surface (light-emitting surface) with a certain area, but ideally, can be regarded as a point light source that emits light from one point on the surface. Therefore, in the following description, it is assumed that light source 4 is an ideal point light source.

In the present embodiment, light controller 2 is integrated with light guide member 1. The term "integral" as used in the present disclosure means that a plurality of elements (parts) can be physically treated as one. That is, the fact that a plurality of elements are integrated means that the plurality of elements are grouped together and can be treated as one member. In this case, the plurality of elements may be integrally inseparable like an integrally molded product, or the plurality of separately created elements may be mechanically bonded, for example, by welding, bonding, caulking, or the like. That is, it suffices that light guide member 1 and light controller 2 are integrated in an appropriate manner.

More specifically, in the present embodiment, as described above, light guide member 1 and light controller 2 are integrated as an integrally molded product. That is, in the present embodiment, light guide member 1 and light controller 2 are an integrally molded product and are inseparably integrated. Therefore, as described above, light source incident surface 10 of light guide member 1 is a "virtual surface" defined inside the integrally molded product of light guide member 1 and light controller 2, and is not accompanied by an entity.

As illustrated in FIG. 2, the plurality of light sources 4 are disposed so as to be arranged at a predetermined interval in the X-axis direction. The plurality of light sources 4 have a one-to-one correspondence with the plurality of light controllers 2. That is, the plurality of light controllers 2 are also disposed so as to be arranged in the X-axis direction, similarly to the plurality of light sources 4. The pitches of the plurality of light sources 4 in the X-axis direction are equal to the pitches of the plurality of light controllers 2.

Light guide member 1 is a member that takes in the light source light from light source 4 into light guide member 1 from light source incident surface 10 and guides the light source light to second surface 12 through light guide member 1, that is, guides the light. As an example in the present embodiment, light guide member 1 is a molded product of a light-transmitting resin material such as acrylic resin, and is formed in a plate shape. That is, light guide member 1 is a light guide plate having a certain thickness.

As described above, light guide member 1 has light source incident surface 10 on which light is incident, and first surface 11 and second surface 12 facing each other. Further, light guide member 1 has end surface 13 facing light source incident surface 10.

Specifically, in the present embodiment, as illustrated in FIGS. 7A to 7D, light guide member 1 has a rectangular plate shape, and two surfaces facing each other in the thickness direction of light guide member 1 are first surface. 11 and second surface 12, respectively. One end surface of the four end surfaces (peripheral surfaces) of light guide member 1 is light source incident surface 10. That is, light guide member 1 is formed in a rectangular shape in a plan view (viewed from one side in the Z-axis direction). As an example, light guide member 1 is formed in a rectangular shape having a smaller dimension in the Y-axis direction than in the X-axis direction. Both surfaces of light guide member 1 in the thickness direction (Z-axis direction) form first surface 11 and second surface 12, respectively. Both surfaces of light guide member 1 in the lateral direction (Y-axis direction) form light source incident surface 10 and end surface 13, respectively.

As described above, one end surface (left surface in FIG. 1A) of the two end surfaces facing each other in the Y-axis direction of light guide member 1 is light source incident surface 10 in which light source light emitted from the plurality of light sources 4 is incident through the plurality of optical controllers 2. First surface 11 of light guide member 1 is the lower surface in FIG. 1A, and second surface 12 is the upper surface in FIG. 1A. Second surface 12 emits planar light 9 from the inside of light guide member 1 to the outside. Therefore, in light guide member 1, when the light source light is incident from one end surface which is light source incident surface 10, second surface 12 emits the light.

In the present embodiment, second surface 12 is a plane parallel to an X-Y plane. Light source incident surface 10 is a plane parallel to the X-Z plane. The "X-Y plane" referred to here is a plane including the X-axis and the Y-axis, and is a plane orthogonal to the Z-axis. Similarly, the "X-Z plane" referred to here is a plane including the X-axis and the Z-axis and is a plane orthogonal to the Y-axis. In other words, second surface 12 is a plane orthogonal to the Z axis, and light source incident surface 10 is a plane orthogonal to the Y axis. Therefore, second surface 12 and light source incident surface 10 are orthogonal to each other.

On the other hand, first surface 11 is not parallel to the X-Y plane, but is a plane inclined with respect to the X-Y plane. That is, first surface 11 and light source incident surface 10 are not orthogonal to each other. Specifically, first surface 11 is inclined with respect to the X-Y plane so as to approach second surface 12 as the distance from light source incident surface 10 increases. That is, in the present embodiment, first surface 11 and second surface 12 are inclined to each other.

Light controller 2 is disposed between light source 4 and light source incident surface 10 of light guide member 1. Light controller 2 controls the light source light output from light source 4 and incident on light incident surface 10. In the present embodiment, optical controller 2 has a collimating function of bringing the light source light output from light source 4 closer to parallel light. That is, light controller 2 is a collimating lens that brings the light source light closer to parallel light by condensing the light source light toward light source incident surface 10 when the light source light that spreads radially from light source 4 is incident. The light source light emitted from light source 4 enters light source incident surface 10 of light guide member 1 through light controller 2. Therefore, the light source light from light source 4 is controlled by optical controller 2 having a collimating function so as to narrow the spreading angle and is emitted toward light source incident surface 10 of light guide member 1. In the present embodiment, it is assumed that the light source light from light source 4 as an ideal point light source is controlled by light controller 2 to the ideal parallel light.

In the present embodiment, as illustrated in FIG. 1A, optical axis Ax1 of the light source light incident from light source incident surface 10 of light guide member 1 is inclined with respect to first surface 11 so that the distance to first surface 11 decreases as the distance from light source incident surface 10 increases. Therefore, the parallel light emitted from light controller 2 to light source incident surface 10 of light guide member 1 becomes parallel light inclined with respect to first surface 11 so that the distance to first surface 11 decreases as the distance from light source incident surface 10 increases. In addition, the dotted arrow in the drawing conceptually represents a light beam (or an optical path) and is not accompanied by an entity.

In the present embodiment, as illustrated in FIG. 2, the plurality of optical controllers 2 are formed so as to be aligned in the X-axis direction at the ends forming light source incident surface 10 of light guide member 1.

That is, in the present embodiment, light controller 2 is integrated with light guide member 1. As described above, the plurality of light controllers 2 each have a one-to-one correspondence with the plurality of light sources 4. Therefore, the plurality of light controllers 2 control the spread angle of the light source light emitted by the corresponding light source 4, and make the light source incident on light source incident surface 10.

Prism 3 is provided on first surface 11, and reflects the light source light passing through the inside of light guide member 1 toward second surface 12. In the present embodiment, the plurality of prisms 3 are provided on first surface 11. Prism 3 is configured to totally reflect the incident light source light. Of course, prism 3 is not limited to a mode in which all the incident light source light is totally reflected, and may include a mode in which a part of the light source light is transmitted through prism 3 without being totally reflected.

In light guide member 1, most of the light source light incident from light source incident surface 10 is emitted from second surface 12 by being reflected by prism 3 without being reflected by the portion of first surface 11 or second surface 12 excluding prism 3. That is, light guide member 1 includes direct optical path L1 in which the light source light incident from light source incident surface 10 is directly reflected by prism 3 and is emitted from second surface 12.

In the present embodiment, prism 3 is formed on first surface 11 so that the cross section viewed from one side in the X-axis direction is a triangular recess. Prism 3 is formed by, for example, processing first surface 11 of light guide member 1. As illustrated in FIG. 1B, prism 3 has a reflective surface 30 that reflects light source light incident on the inside of light guide member 1 toward second surface 12. FIG. 1B is a schematic end surface view of enlarged area A1 of FIG. 1A.

Angle $\theta1$ formed by reflective surface 30 and first surface 11 (that is, the inclination angle of reflective surface 30) is an angle such that incident angle $\theta0$ of the light source light incident on reflective surface 30 is equal to or greater than a critical angle. That is, reflective surface 30 is inclined with respect to first surface 11 so that the incident light source light is totally reflected. Inclination angle $\theta1$ of reflective surface 30 is set so that the light source light totally reflected by reflective surface 30 is incident in a direction perpendicular to second surface 12.

Figure 7A:
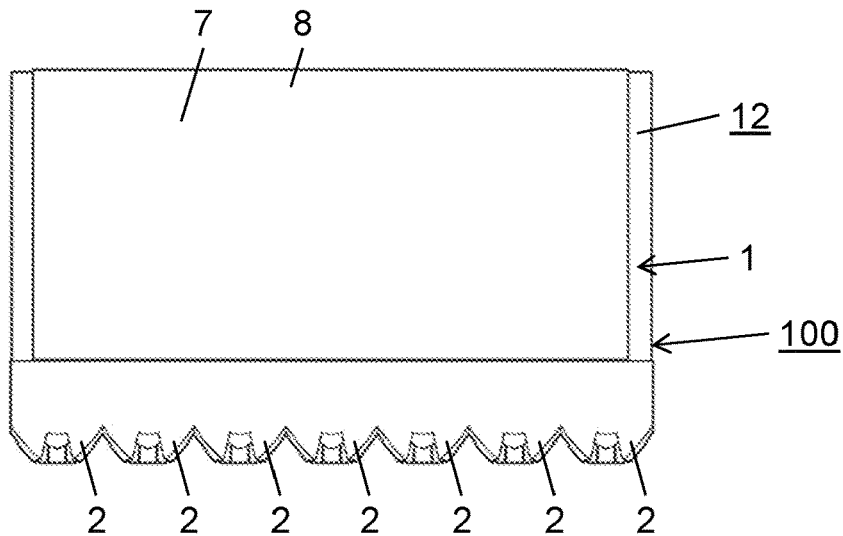
FIG. 7A is a plan view of the same optical system.
Figure 7B:
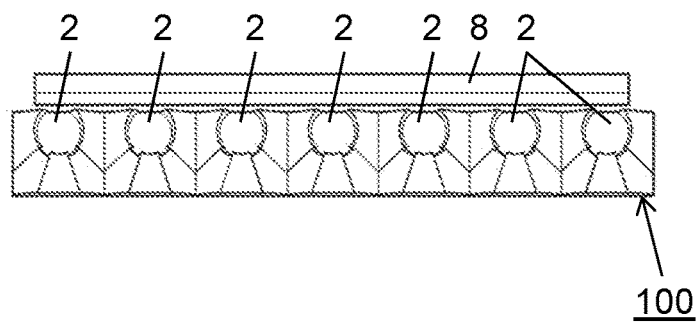
FIG. 7B is a front view of the same optical system.
Figure 7D:
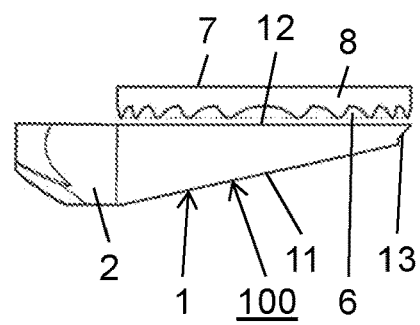
FIG. 7D is a side view of the same optical system.
Figure 7C:
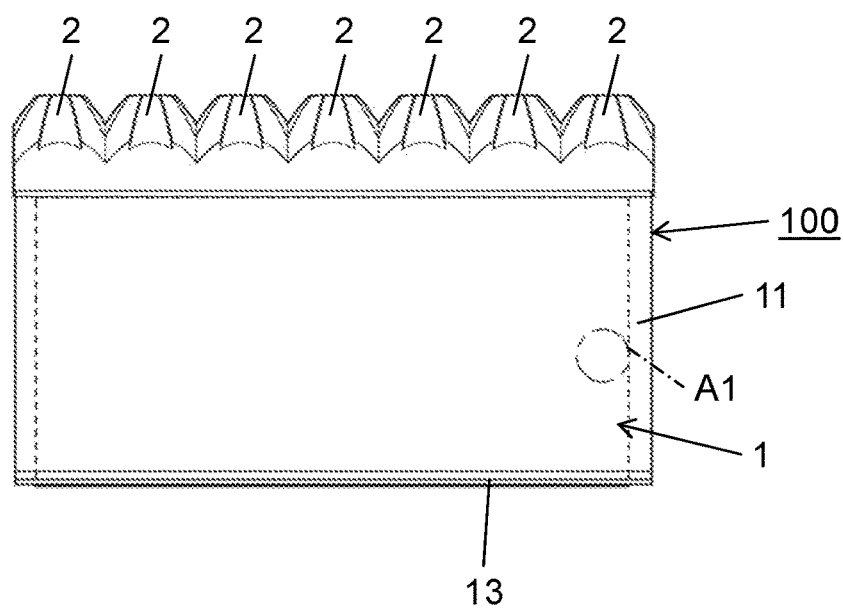
FIG. 7C is a bottom view of the same optical system.
Figure 8A:
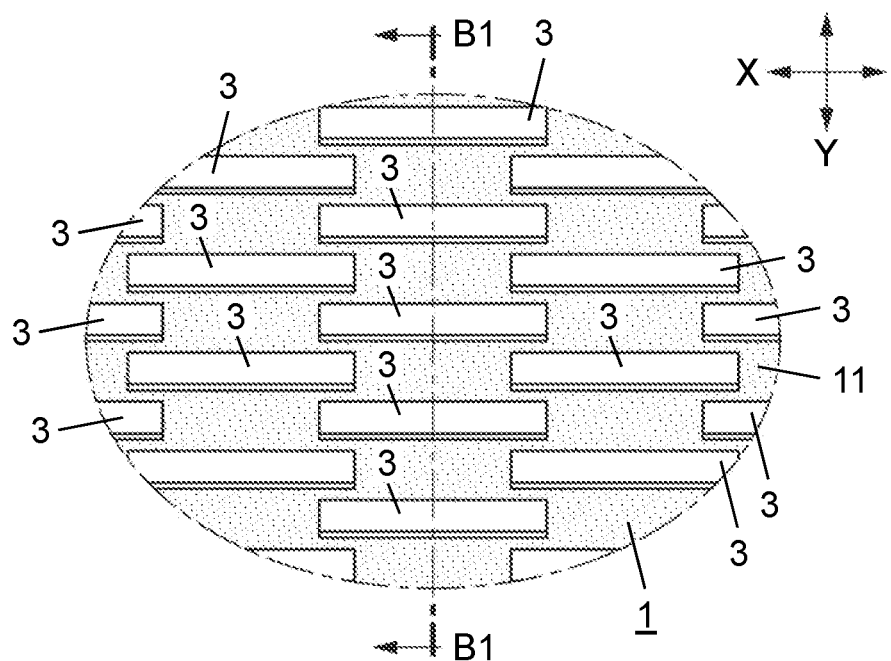
FIG. 8A is an enlarged schematic view of region A1 of FIG. 7C.
Figure 8B:
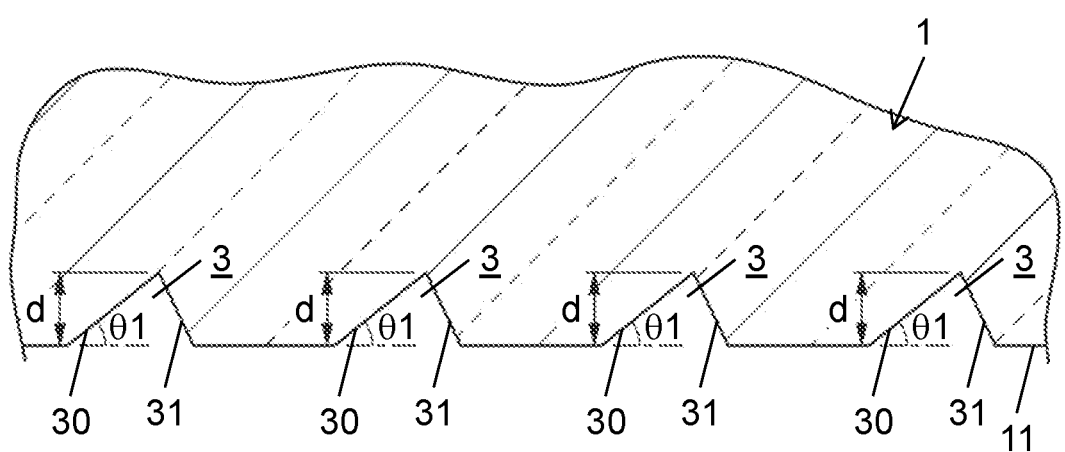
FIG. 8B is a cross-sectional view taken along line B1-B1 of FIG. 8A.

In the present embodiment, as illustrated in FIGS. 8A and 8B, the plurality of prisms 3 are arranged in a zigzag pattern on first surface 11 when viewed from one side in the Z-axis direction. Here, FIG. 8A is a schematic plan view in which area A1 of FIG. 7C is enlarged. FIG. 8B is a view schematically illustrating a cross section of line B1-B1 of FIG. 8A. Although only a part of first surface 11 is illustrated in FIG. 8A, in reality, a plurality of prism 3 are formed over substantially the entire area of first surface 11.

Specifically, each prism 3 has a length in the X-axis direction, and is formed so that the plurality of prisms 3 are arranged at intervals in the longitudinal direction (X-axis direction). The plurality of prisms 3 are formed so as to be arranged at intervals even in the Y-axis direction. Then, when the rows of the plurality of prisms 3 arranged in the X-axis direction are a first row, a second row, a third row, . . . counting from light source incident surface 10 side in the Y-axis direction, the plurality of prisms 3 included in the even-numbered rows and the plurality of prisms 3 included in the odd-numbered rows are positioned at positions displaced from each other in the X-axis direction. Here, the plurality of prisms 3 included in the even-numbered rows and the plurality of prisms 3 included in the odd-numbered rows are arranged so that the ends thereof in the longitudinal direction (X-axis direction) overlap each other in the Y-axis direction. According to such an arrangement, the plurality of prisms 3 are arranged without a gap in the X-axis direction when viewed from light source incident surface 10, and the light source light incident on the inside of light guide member 1 from light source incident surface 10 is reflected by any one of plurality of prisms 3.

As an example in the present embodiment, the plurality of prisms 3 all have the same shape. Therefore, as illustrated in FIG. 8B, inclination angles $\theta1$ of reflective surfaces 30 are the same in the plurality of prisms 3 arranged in the Y-axis direction. The size of prism 3 such as the dimension of prism 3 in the longitudinal direction and depth d (in other words, the height of prism 3) of a recess as prism 3 is also the same in the plurality of prisms 3. That is, in the present embodiment, the plurality of prisms 3 are provided so as to be arranged in a direction (Y-axis direction) in which the light source light is incident on light source incident surface 10. Here, the plurality of prisms 3 have the same shape. Therefore, if incident angle $\theta0$ of the light source light incident on reflective surface 30 is constant, even if the light source light is incident on any of the plurality of prisms 3, the directions of the light source light reflected by reflective surfaces 30 of prisms 3 are the same. Therefore, it is possible to make all the light source light reflected by the plurality of prisms 3 incident in the direction perpendicular to second surface 12.

Further, as an example, depth d of the recessed portion as prism 3 (in other words, the height of prism 3) is 1 µm or more and 100 µm or less. Similarly, as an example, the pitch of the plurality of prisms 3 in the Y-axis direction is 1 µm or more and 1000 µm or less. As a specific example, depth d of the recessed portion as prism 3 is a dozen µm, and the pitches of the plurality of prisms 3 in the Y-axis direction are a hundred and several tens of µm.

As illustrated in FIG. 1A, light refraction member 8 takes in planar light 9 extracted from second surface 12 of light guide member 1 into light refraction member 8 from incident surface 6 and refracts planar light 9 by the plurality of refractors 81 included in light refraction member 8 to emit planar light 9 as emitted light 14 from emitting surface 7. As an example in the present embodiment, light refraction member 8 is a molded product of a light-transmitting resin material such as acrylic resin, and is formed in a plate shape.

As described above, light refraction member 8 includes incident surface 6, the plurality of refractors 81, and emitting surface 7, and incident surface 6 is provided so as to face second surface 12 of light guide member 1.

Specifically, in the present embodiment, as illustrated in FIGS. 1A and 2 to 4B, light refraction member 8 has a rectangular plate shape, and two surfaces facing each other in the thickness direction (Z-axis direction) of light refraction member 8 are incident surface 6 and emitting surface 7, respectively. Incident surface 6 and emitting surface 7 are planes parallel to each other, and both are provided parallel to the X-Y plane.

In the present embodiment, the plurality of refractors 81 are provided on incident surface 6 side by side in the Y-axis direction.

The plurality of refractors 81 have, for example, grooves 82 extending in the X-axis direction. In the present embodiment, each of the plurality of refractors 81 is one groove 82 extending along the X-axis direction. That is, the plurality of refractors 81 are a plurality of grooves 82. As illustrated in FIGS. 3 and 4A, one refractor 81 (one groove 82) has two peaks 83 extending in the X-axis direction and one valley 84 provided between two peaks 83, and two peaks 83 and one valley 84 are provided in parallel in the Y-axis direction. Here, peak 83 is a portion where the thickness of light refraction member 8 in the Z-axis direction changes from increasing to decreasing along a Y direction in the plurality of refractors 81 (plurality of grooves 82). Valleys 84 are portions of the plurality of refractors 81 (plurality of grooves 82) in which the thickness of light refraction member 8 in the Z-axis direction changes from decreasing to increasing along the Y direction.

In the present embodiment, incident surface 6 is a virtual plane in contact with a plurality of peaks 83 included in the plurality of refractors 81 (plurality of grooves 82). A part of the plurality of peaks 83 may not be in contact with incident surface 6.

Each of the plurality of refractors 81 is also a curved lens having a curvature in the Y-axis direction. That is, as illustrated in FIG. 4A, one peak 83 and one valley 84 of one refractor 81 (one groove 82) are connected by a continuous curve when viewed from the X-axis direction, and the curved portion serves as a curved lens. Therefore, light refraction member 8 including the plurality of refractors 81 has a function of a lens as an optical element for refracting planar light 9 incident on incident surface 6 to diverge or focus planar light 9.

In the present embodiment, depth h of groove 82 changes linearly along the X-axis direction. Here, as illustrated in FIG. 4A, depth h of groove 82 is the distance between incident surface 6 and valley 84 in the Z-axis direction. That is, as illustrated in FIG. 4B, when depth h of the groove 82 changes linearly along the X-axis direction, valley 84 is a straight line having an inclination with respect to incident surface 6 in a cross section parallel to the X-Z plane. FIG. 4B is a view schematically illustrating a cross section of the F1-F1 line of FIG. 4A.

On the other hand, peak 83 is a straight line parallel to incident surface 6 in a cross section parallel to the X-Z plane. In the present embodiment, the plurality of refractors 81 are continuous surfaces along the X-axis direction.

As a result, in the present embodiment, the curvature of refractor 81 between peak 83 and valley 84 in the Y-axis direction either continuously increases or decreases along one direction in the X-axis direction. Therefore, the angle at which planar light 9 incident from incident surface 6 is refracted by the plurality of refractors 81 is either increased or decreased along one direction in the X-axis direction.

With the configuration of these light refraction members 8, the angle at which planar light 9 incident from incident surface 6 is refracted can be controlled, and emitted light 14 having a desired light distribution can be obtained on emitting surface 7.

The range of depth h of groove 82 is set so that emitted light 14 can have a desired light distribution on emitting surface 7, preferably satisfies, for example, 0.01 mm≤h≤5 mm, and further preferably satisfies 0.05 mm≤h≤1 mm. As an example, depth h of the groove 82 is formed so that the shallowest portion is 0.1 mm and the deepest portion is 0.2 mm. That is, in the present embodiment, as illustrated in FIGS. 4A and 4B, depths h1 and h2 of grooves 82 in end surface 15 and end surface 16 in the X-axis direction of light refraction member 8 are 0.1 mm and 0.2 mm, respectively.

As illustrated in FIG. 4A, in the present embodiment, width w of grooves 82 of the plurality of refractors 81 (plurality of grooves 82) is different from each other. Here, width w of groove 82 is the distance in the Y-axis direction between two peaks 83 of one refractor 81 (one groove 82). Width w of grooves 82 is different not only when widths w of grooves 82 of the plurality of refractors 81 (plurality of grooves 82) are all different, but also when some of the grooves have different widths.

In the present embodiment, in light refraction member 8, the curvatures of the plurality of refractors 81 in the Y-axis direction are set so as to diverge planar light 9 incident on incident surface 6. In other words, light refraction member 8 has a negative refractive power with respect to planar light 9 incident on incident surface 6. As a result, the range of emitted light 14 emitted on emitting surface 7 becomes larger than the range of planar light 9 incident on incident surface 6.

Hereinafter, the light emission principle of optical system 100 of the present embodiment will be described with reference to FIGS. 1A and 1B.

First, as illustrated in FIG. 1A, the spread angle of the light source light emitted from light source 4 is controlled when the light passes through corresponding light controller 2. The light source light whose spread angle is controlled is emitted from light controller 2 toward light source incident surface 10 of light guide member 1. In the present embodiment, the light source light emitted from light controller 2 becomes parallel light parallel to second surface 12 and is incident perpendicular to light source incident surface 10.

Further, as already described, optical axis Ax1 of the light source light incident from light source incident surface 10 of light guide member 1 is inclined with respect to first surface 11 so that the distance to first surface 11 decreases as the distance from light source incident surface 10 increases.

Therefore, most of the light source light incident on light source incident surface 10 do not reach second surface 12 and end surface 13 facing light source incident surface 10 of light guide member 1, but reaches first surface 11.

Then, as illustrated in FIG. 1B, most of the light source light incident on light source incident surface 10 is totally reflected by reflective surface 30 of any one of the plurality of prisms 3 provided on first surface 11 without being reflected on first surface 11 and second surface 12. That is, light guide member 1 includes direct optical path L1 in which the light source light incident from light source incident surface 10 is directly reflected by prism 3 and emitted from second surface 12. Further, in the present embodiment, direct optical path L1 includes an optical path of light source light totally reflected by prism 3.

The light totally reflected by reflective surface 30 of prism 3 follows an optical path orthogonal to second surface 12, and is emitted as planar light 9 from second surface 12.

Here, in the present embodiment, as described above, inclination angles θ1 of reflective surfaces 30 are the same in the plurality of prisms 3. When parallel light parallel to second surface 12 is incident on such a plurality of prisms 3, incident angle θ0 of the light incident on reflective surface 30 becomes constant. Therefore, the direction of the light reflected by reflective surface 30 is the same in any of the plurality of prisms 3. Therefore, in the present embodiment, all the light source light that reaches second surface 12 in direct optical path L1 are incident on second surface 12 at the same angle. The "same angle" referred to here may include not only exactly the same angle but also the angle with an error of up to about 2 degrees or 3 degrees. Ideally, all the light source light that reaches second surface 12 in direct optical path L1 is incident at 90 degrees with respect to second surface 12, that is, in a direction orthogonal to second surface 12.

In the present embodiment, since the plurality of prisms 3 are disposed over the entire area of first surface 11, the light source light passing through direct optical path L1 as described above is evenly emitted from the entire area of second surface 12 of light guide member 1. As a result, entire second surface 12 emits surface light, and planar light 9 parallelized in the Z-axis direction is emitted.

Planar light 9 parallel to the Z-axis direction emitted from entire second surface 12 is incident on incident surface 6 of light refraction member 8 provided so as to face light guide member 1. In the present embodiment, second surface 12 of light guide member 1 and incident surface 6 of light refraction member 8 are provided parallel to each other in the Z-axis direction, and planar light 9 emitted orthogonally to second surface 12 is also incident orthogonally on incident surface 6.

Planar light 9 incident orthogonally on incident surface 6 is refracted by the plurality of refractors 81 provided on incident surface 6, and planar light 9 changes from a state of being parallel to the Z-axis direction to a state of having an inclination with respect to the Z-axis direction. As described above, since light refraction member 8 has a negative refractive power with respect to planar light 9, planar light 9 is refracted so that the range of emitted light 14 emitted on emitting surface 7 is larger than the range of planar light 9 incident on incident surface 6. In this way, the light distribution of emitted light 14 is controlled by the plurality of refractors 81 of light refraction member 8.

Figure 9:
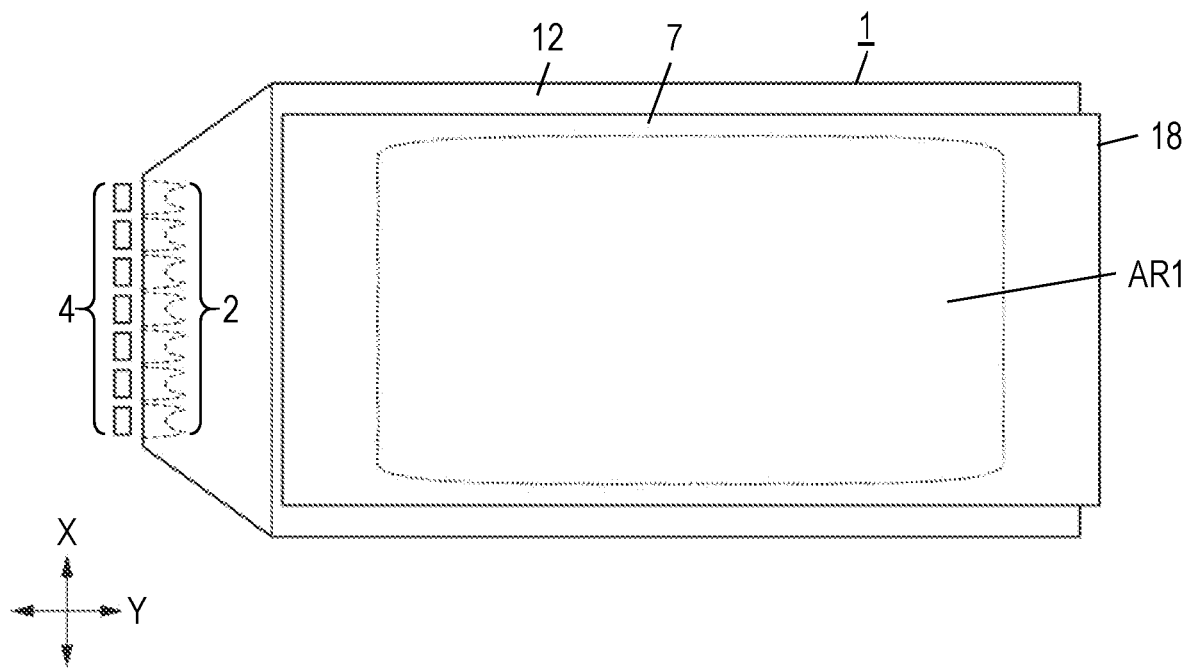
FIG. 9 is a plan view schematically illustrating a light distribution of an optical system of a comparative example.

Hereinafter, the advantages of the optical system 100 of the present embodiment, which includes light refraction member 8 whose direction of refracting planar light 9 changes along the X-axis direction, will be described below with reference to FIGS. 9 and 10.

In a general light refraction member such as linear Fresnel lens 18 (hereinafter, referred to as a light refraction member of a comparative example), since the curvature of the lens in the Y-axis direction along the X-axis direction is constant, the direction in which planar light 9 is refracted is constant along the X-axis direction. That is, as illustrated in FIG. 9, light distribution range AR1 of emitted light 14 on emitting surface 7, which is controlled by linear Fresnel lens 18, has a constant spread in the Y-axis direction along the X-axis direction. Light distribution range AR1 and light distribution range AR2 illustrated in FIGS. 9 and 10 schematically illustrate the light distribution of emitted light 14 on emitting surface 7.

However, when an optical system including a light refraction member is applied to a head-up display mounted on moving object B1 as in display system 300 according to the present embodiment, with respect to light refraction member 8, it is required to appropriately control the spread of the light distribution of emitted light 14 in the Y-axis direction along the X-axis direction for the following reasons.

Display surface 312 of image display unit 310 of the head-up display receives emitted light 14 from light refraction member 8 and displays an image. Display surface 312 has a shape (for example, a rectangular shape) that matches the range of the image projected on user U1, that is, the shape of windshield B12. Emitting surface 7 of light refraction member 8 is also provided in a shape that matches display surface 312.

Here, the image displayed on display surface 312 has a portion where the light distribution changes before the image is reflected by windshield B12 and visually recognized by user U1. Therefore, it is necessary to give emitted light 14 from light refraction member 8 that functions as the backlight of display surface 312 a light distribution in advance so as to obtain an optimum image when user U1 visually recognizes the image.

For example, in the present embodiment, in the image displayed on rectangular display surface 312, the light intensity at the left and right ends of windshield B12 decreases in the upward direction when viewed from user U1 of windshield B12 by the time user U1 visually recognizes the image. This is because the length of the optical path between display surface 312 and windshield B12 becomes longer toward the upper side of windshield B12 and toward the left and right ends, and the light is strongly scattered. In the present embodiment, the vertical direction seen from user U1 of windshield B12 corresponds to the vertical direction in which the X-axis directions of FIGS. 9 and 10 are reversed, and the left-right direction seen from user U1 of windshield B12 corresponds to the Y-axis direction reversed left and right.

Figure 10:
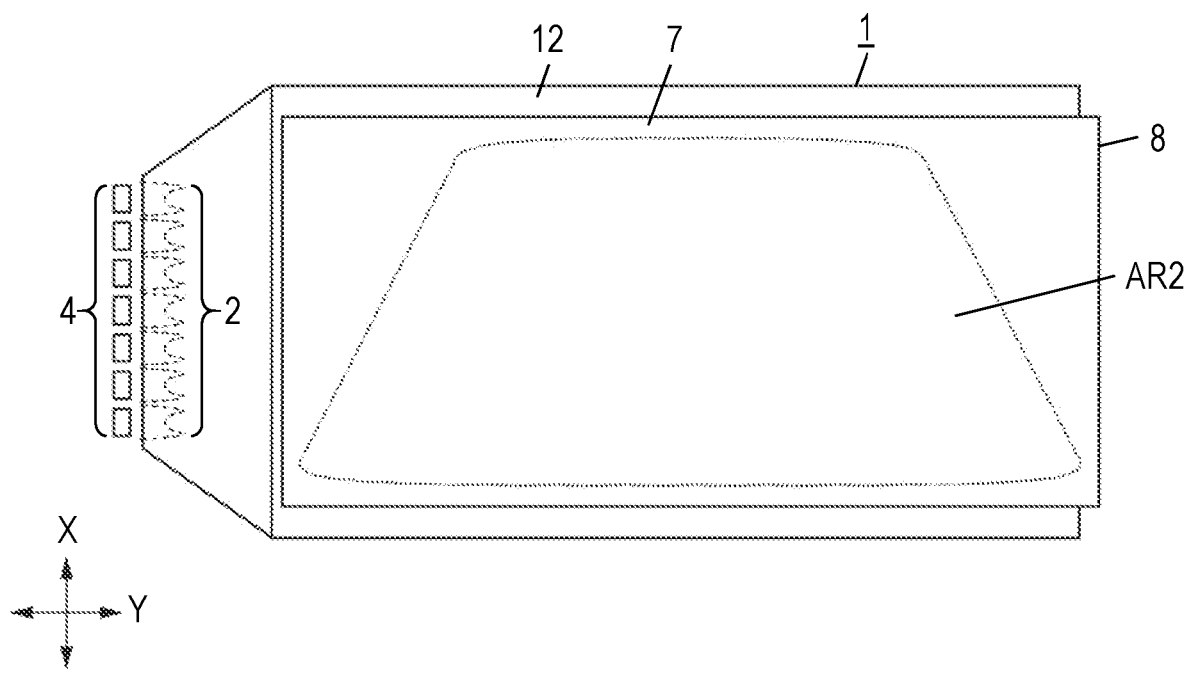
FIG. 10 is a plan view schematically illustrating the light distribution of the optical system of the embodiment.

Therefore, as illustrated in FIG. 10, by setting the curvatures of the plurality of refractors 81 of light refraction member 8, light distribution range AR2 of emitted light 14 on emitting surface 7 is widened toward the lower side in the X-axis direction in the Y-axis direction. As a result, it is possible to correct the decrease in light intensity at the left and right ends along the upward direction of windshield B12 so that user U1 can visually recognize an appropriate image.

(2.4) Mold for Forming Light Refraction Member

Mold 17 for forming light refraction member 8 in the present embodiment will be described with reference to FIGS. 11 to 13. The arrows indicating the "X-axis direction", "Y-axis direction", and "Z-axis direction" in the drawings are illustrated for explanation purposes only and are not accompanied by an entity.

Figure 11:
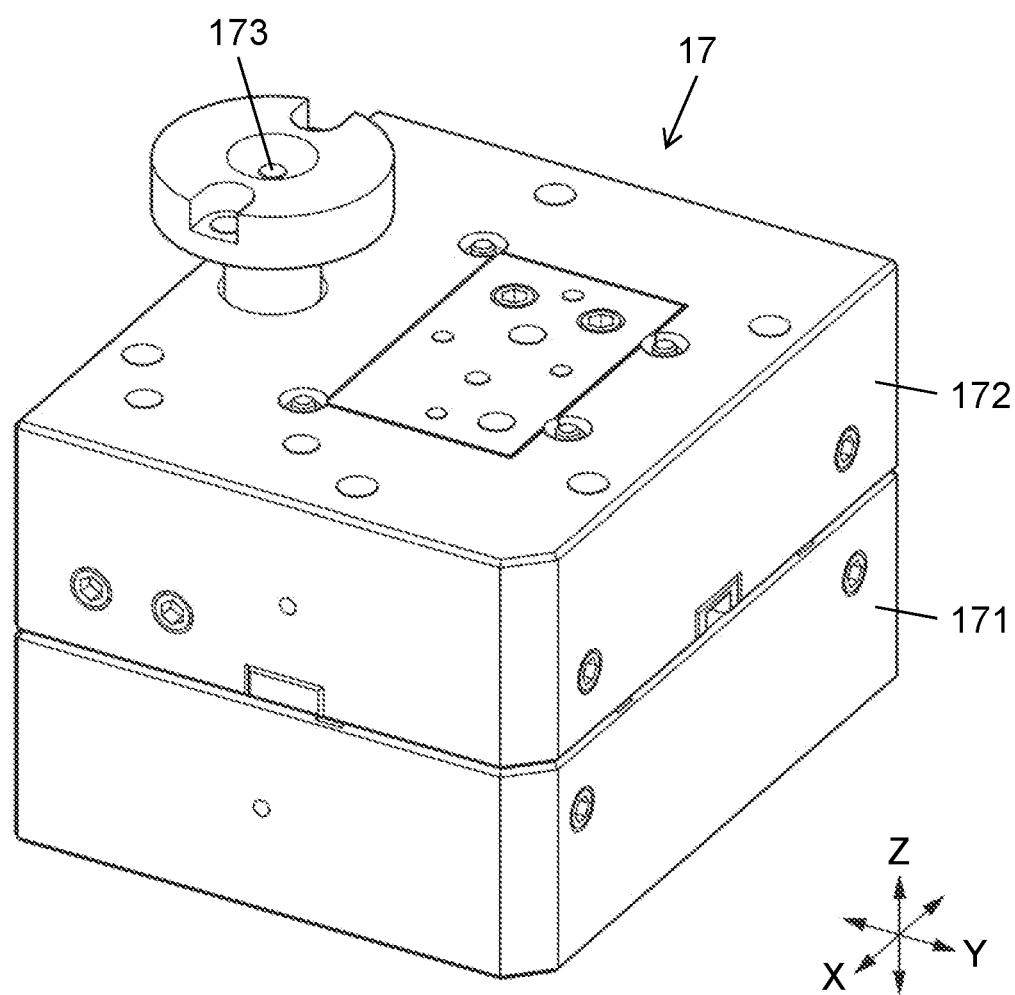
FIG. 11 is a perspective view schematically illustrating a mold according to the embodiment.
Figure 12:
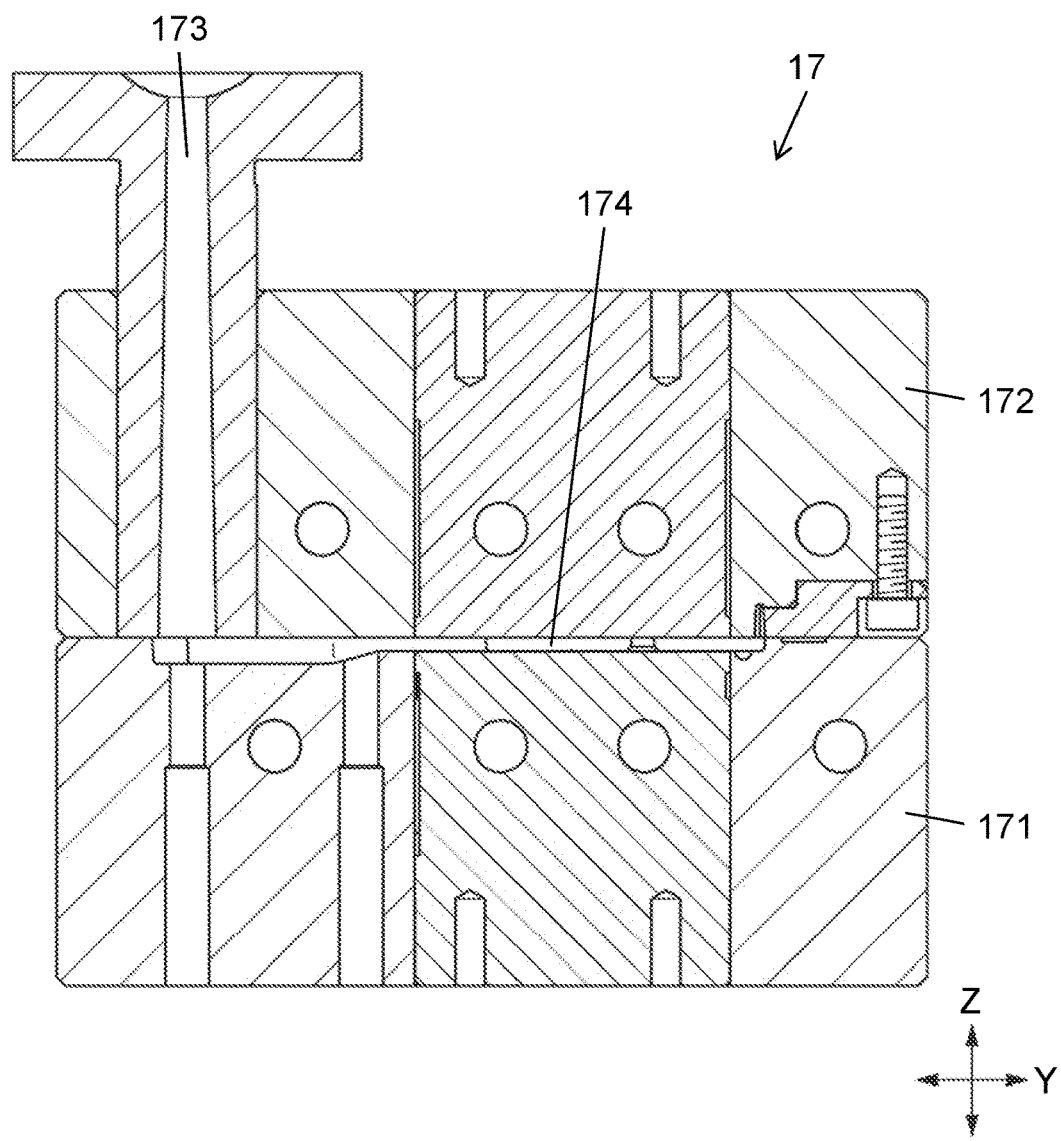
FIG. 12 is a cross-sectional view taken along line Y-Z schematically illustrating the same mold.

As illustrated in FIGS. 11 and 12, mold 17 includes first mold portion 171, second mold portion 172, and supply path 173. First mold portion 171 includes cavity 174, which is a space to which a molten resin is supplied. Cavity 174 has a shape for forming light refraction member 8. Second mold portion 172 is clamped with first mold portion 171. Supply path 173 supplies the molten resin into cavity 174.

First mold portion 171 and second mold portion 172 are made of, for example, a stainless alloy, and nickel alloy plating is applied on the stainless alloy.

Figure 13:
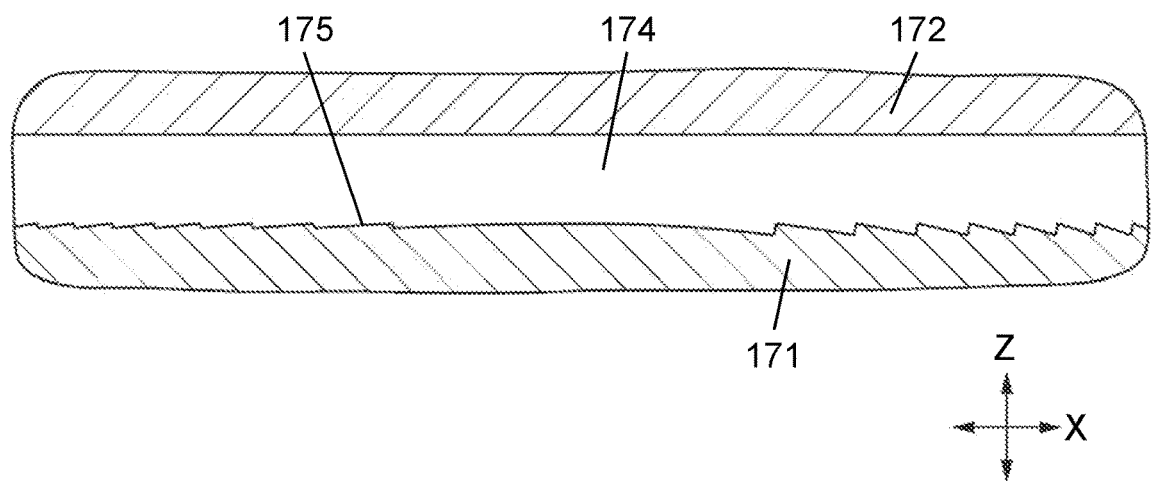
FIG. 13 is an X-Z cross-sectional view schematically illustrating a cavity included in the mold of the same.

As illustrated in FIG. 13, cavity 174 of first mold portion 171 is provided with convex portion 175 for forming the plurality of grooves 82 which are the plurality of refractors 81 of light refraction member 8. The surface on which convex portion 175 is formed is molded into a mirror finish.

Supply path 173 is provided so as to penetrate second mold portion 172 and reach cavity 174 of the first mold portion. A molten acrylic resin is filled into cavity 174 from supply path 173 in a state where first mold portion 171 and second mold portion 172 are fixed under pressure. The acrylic resin filled in cavity 174 is cured by cooling, then removed from mold 17, and undergoes finishing processing such as polishing to become light refraction member 8.

(3) Modification Example

The above-described embodiment is just one of the various embodiments of the present disclosure. The above-described embodiment can be changed in various ways depending on the design and the like as long as the object of the present disclosure can be achieved.

Each drawing described in the above-described embodiment is a schematic view, and the ratio of the size and the thickness of the components in the drawing does not necessarily reflect an actual dimensional ratio.

Hereinafter, modification examples of the above-described exemplary example will be listed. However, the same reference numerals will be given to the components common to the above-describe embodiment, and the description thereof will be omitted as appropriate. In addition, each configuration of the modification examples described below can be applied in combination with each configuration described in the above-described embodiment as appropriate.

(3.1) Modification Example 1

In optical system 100 of the above-described embodiment, the light source light is incident on light source incident surface 10 of light guide member 1 along the direction in which the plurality of refractors 81 are aligned with incident surface 6 of light refraction member 8. On the other hand, optical system 100 of Modification Example 1 differs from the above-described embodiment in that the light source light is incident on light source incident surface 10 of light guide member 1 along the direction in which the plurality of refractors 81 intersect with the direction in which light refraction member 8 is aligned with incident surface 6.

Figure 14:
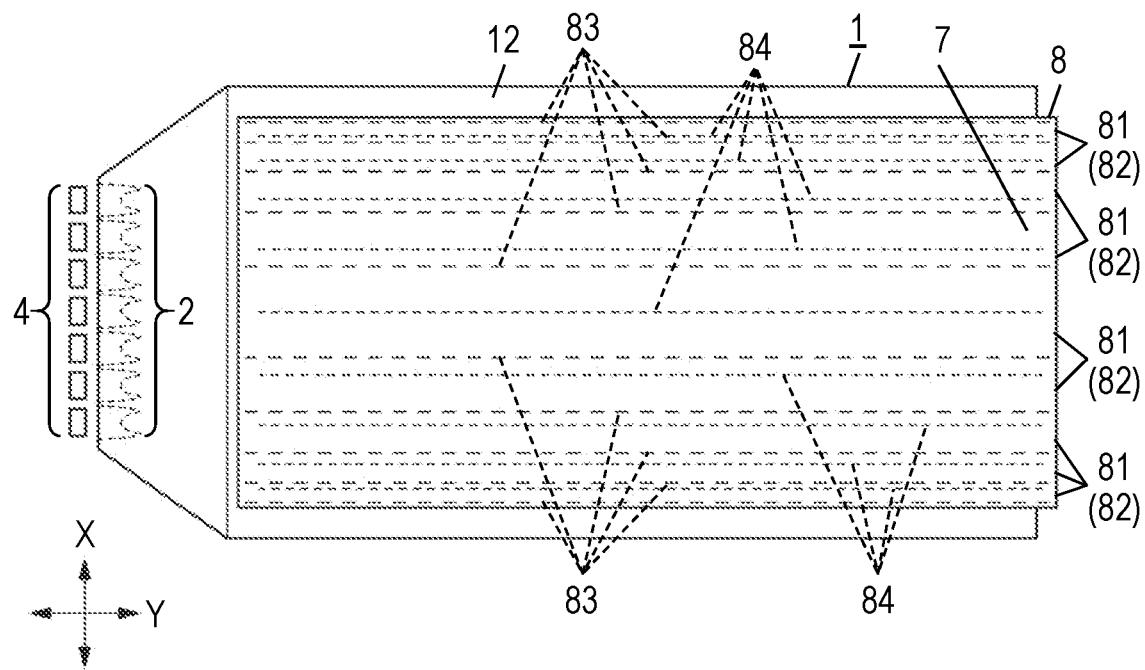
FIG. 14 is a plan view schematically illustrating a modification example of the same optical system.

That is, in Modification Example 1, as illustrated in FIG. 14, the plurality of refractors 81 (plurality of grooves 82) are provided on incident surface 6 along with the width direction (X-axis direction) of light guide member 1. That is, planar light 9 incident on incident surface 6 is refracted by the plurality of refractors 81 provided side by side in the X-axis direction, and is emitted from emitting surface 7 as emitted light 14.

The advantages of optical system 100 of Modification Example 1 will be described below.

For example, a case is assumed, in which the light intensity at the upper and lower ends of the windshield B12 decreases along the left direction of windshield B12 by the time the image displayed on rectangular display surface 312 is visually recognized by user U1. At this time, by setting the curvatures of the plurality of refractors 81 arranged in the X-axis direction in Modification Example 1, the light distribution range of emitted light 14 in the X-axis direction is widened along the right direction in the Y-axis direction. As a result, the decrease in light intensity at the upper and lower ends along the left direction of windshield B12 can be corrected, and an appropriate image can be visually recognized by user U1.

(3.2) Other Modification Examples

Hereinafter, other modification examples of the embodiment will be listed. The following modification examples may be realized by combining the modification examples as appropriate.

The plurality of refractors 81 may be provided on emitting surface 7, or may be provided on both incident surface 6 and emitting surface 7.

The plurality of refractors 81 may have discontinuous points along the width direction of light guide member 1 that intersects the depth direction of light guide member 1 perpendicularly. That is, when the plurality of refractors 81 are curved lenses, and the light incident on the plurality of refractors 81 is moved along the width direction of light guide member 1 while maintaining the direction of the optical axis, there may be a point where the direction of the optical axis of emitted light 14 changes and the change becomes discontinuous.

Depth h of the plurality of refractors 81 (plurality of grooves 82) may change non-linearly along the X-axis direction. For example, depth h may increase or decrease non-linearly along one direction in the X-axis direction. That is, the curvatures of plurality of refractors 81 in the Y-axis direction may be non-linearly increased or decreased along one direction in the X-axis direction, and the angle at which planar light 9 incident from incident surface 6 is refracted by the plurality of refractors 81 may be non-linearly increased or decreased along one direction in the X-axis direction.

(4) Summary

As described above, a light refraction member (8) of a first aspect has an incident surface (6) on which planar light (9) is incident, a plurality of refractors (81) that refract the planar light (9), and an emitting surface (7) from which the planar light (9) refracted by the plurality of refractors (81) is emitted as emitted light (14). The plurality of refractors (81) are provided side by side in a first direction on at least one of the incident surface (6) and the emitting surface (7), and each of the plurality of refractors (81) has an area in which a direction in which the planar light (9) is refracted changes along a second direction intersecting the first direction.

According to the first aspect, the light distribution of the emitted light (14) can be controlled.

According to the first aspect, in the light refraction member (8) of a second aspect, each of the plurality of refractors (81) is continuous along the second direction.

According to the second aspect, the light distribution of the emitted light (14) can be controlled.

In a light refraction member (8) of a third aspect of the first or second aspect, each of the plurality of refractors (81) has a groove (82) extending along the second direction, and the depth (h) of the groove (82) changes linearly along the second direction.

According to the third aspect, the light distribution of the emitted light (14) can be controlled.

In a fourth aspect of the light refraction member (8) of any one of the first to third aspects, each of the plurality of refractors (81) has the groove (82) extending along the second direction, and the depth (h) of the groove (82) is 0.01 mm≤h≤5 mm.

According to the fourth aspect, the light distribution of the emitted light (14) can be controlled.

In a fifth aspect of the light refraction member (8) of any one of the first to fourth aspects, the member has a negative refractive power with respect to the planar light (9) incident on the incident surface (6) in any one of the first to fourth aspects.

According to the fifth aspect, the planar light (9) can be diffused.

An optical system (100) of a sixth aspect includes a light refraction member (8) of any one of the first to fifth aspects, a light guide member (1), and a prism (3). The light guide member (1) has a light source incident surface (10) on which the light source light from the light source is incident, and a first surface (11) and a second surface (12) facing each other. A prism (3) is provided on the first surface (11) and reflects the light source light passing through the inside of the light guide member (1) toward the second surface (12). The light guide member (1) includes a direct optical path (L1) in which the light source light incident from the light source incident surface (10) is directly reflected by the prism (3) and is emitted as planar light (9) from the second surface (12).

According to a sixth aspect, the light source light incident from the light source incident surface (10) is extracted from the second surface (12) as planar light (9), and the extraction efficiency can be improved. The light distribution of emitted light (14) can be controlled.

In a seventh aspect of the optical system (100) of the sixth aspect, the light source light is incident on the light source incident surface (10) along the first direction.

According to the seventh aspect, the light source light incident from the light source incident surface (10) is extracted from the second surface (12) as planar light (9), and the extraction efficiency can be improved. The light distribution of emitted light (14) can be controlled.

In an eighth aspect of the optical system (100) of the sixth aspect, the light source light is incident on the light source incident surface (10) along a direction intersecting the first direction.

According to the eighth aspect, the light source light incident from the light source incident surface (10) is extracted from the second surface (12) as planar light (9), and the extraction efficiency can be improved. The light distribution of emitted light (14) can be controlled.

A lighting system (200) of a ninth aspect includes the optical system (100) of any one of the sixth to eighth aspects, and a light source (4) that emits light source light to a light source incident surface (10).

According to the ninth aspect, the light source light incident from the light source incident surface (10) is extracted from the second surface (12) as planar light (9), and the extraction efficiency can be improved. The light distribution of emitted light (14) can be controlled.

A display system (300) of a tenth aspect includes the lighting system (200) of the ninth aspect, and a display (5) that receives emitted light (14) and displays an image.

According to the tenth aspect, the light source light incident from the light source incident surface (10) is extracted from the second surface (12) as planar light (9), and the extraction efficiency can be improved. The light distribution of emitted light (14) can be controlled.

A moving object (B1) of an eleventh aspect includes the display system (300) of the tenth aspect, and a moving object body (B11) on which the display system (300) is mounted.

According to the eleventh aspect, the light source light incident from the light source incident surface (10) is extracted from the second surface (12) as planar light (9), and the extraction efficiency can be improved. The light distribution of emitted light (14) can be controlled.

A mold (17) of a twelfth aspect is a mold for forming the light refraction member (8), and includes a first mold portion (171) provided with a cavity (174), a second mold portion (172) to be clamped with the first mold portion (171), and a supply path (173) for supplying molten resin into the cavity (174). The cavity (174) has a shape for forming the light refraction member (8). The light refraction member (8) an incident surface (6) on which planar light (9) is incident, a plurality of refractors (81) that refract the planar light (9), and an emitting surface (7) from which the planar light (9) refracted by the plurality of refractors (81) is emitted as emitted light (14). The plurality of refractors (81) are provided side by side in a first direction on at least one of the incident surface (6) and the emitting surface (7), and each of the plurality of refractors (81) has an area in which a direction in which the planar light (9) is refracted changes along a second direction intersecting the first direction.

According to the twelfth aspect, the light refraction member (8) capable of controlling the light distribution of the emitted light (14) can be formed.

The second to fifth aspects are not essential configurations for the light refraction member (8) and can be omitted as appropriate. The seventh and eighth aspects are not essential configurations for the optical system (100) and can be omitted as appropriate.

In the present disclosure, the light distribution of the emitted light can be controlled.

What is claimed is:

1. A light refraction member applied to a head-up display mounted on a moving object, the head-up display receiving emitted light from the light refraction member and displays an image, the light refraction member comprising:
   an incident surface on which planar light is incident;
   a plurality of refractors that refract the planar light; and
   an emitting surface, which faces the incident surface, and from which the planar light refracted by the plurality of refractors is emitted as emitted light, wherein
each of the plurality of refractors is a curved lens having a shape recessed with respect to the incident surface, and is provided side by side in a first direction on the incident surface, and
each of the plurality of refractors has an area in which a direction in which the planar light is refracted changes along a second direction intersecting the first direction so that a light distribution range on the emitting surface of the emitted light is wider in the first direction in a direction corresponding to an upward direction of the image in the second direction.

2. The light refraction member of claim 1, wherein
each of the plurality of refractors is continuous along the second direction.

3. The light refraction member of claim 1, wherein
each of the plurality of refractors has a groove extending along the second direction, and
a depth of the groove changes linearly along the second direction.

4. The light refraction member of claim 1, wherein
each of the plurality of refractors has a groove extending along the second direction, and
a depth h of the groove is 0.01 mm≤h≤5 mm.

5. The light refraction member of claim 1, wherein
the light refraction member has a negative refractive power with respect to the planar light incident on the incident surface.

6. An optical system comprising:
the light refraction member of claim 1;
a light guide member that includes a light source incident surface on which light source light from a light source is incident, and a first surface and a second surface facing each other;
a prism that is provided on the first surface and reflects the light source light passing through an inside of the light guide member toward the second surface, and
a light controller that is disposed between the light source and the light source incident surface and is integrated with the light guide member, the light controller having a collimating function for bringing the light source light output from the light source closer to parallel light,
wherein
the light guide member includes a direct optical path in which the light source light incident from the light source incident surface is directly reflected by the prism and is emitted as the planar light from the second surface to the light refraction member.

7. The optical system of claim 6, wherein
the light source light is incident on the light source incident surface along the first direction.

8. The optical system of claim 6, wherein
the light source light is incident on the light source incident surface along a direction intersecting the first direction.

9. A lighting system comprising:
the optical system of claim 6; and
a light source that emits the light source light to the light source incident surface of the light guide member,
wherein
the light source includes a plurality of solid-state light-emitting elements arranged in the width direction of the light guiding member;
the light controller includes a plurality of individual light controllers arranged in the width direction of the light guide member;
each of the plurality of solid-state light-emitting elements corresponds one-to-one to each individual light controllers of the light controller; and
each of the individual light controllers is integrated with the light guiding member.

10. A display system comprising:
the lighting system of claim 9; and
a display device that receives the emitted light and displays an image.

11. A moving object comprising:
the display system of claim 10; and
a moving object body that is equipped with the display system.

* * * * *